United States Patent [19]

Honjo

[11] Patent Number: 4,931,858
[45] Date of Patent: Jun. 5, 1990

[54] WAVEFORM IMPROVING APPARATUS

[75] Inventor: Masahiro Honjo, Neyagawa, Japan

[73] Assignee: Matsushita Electric Industrial Co., Ltd., Osaka, Japan

[21] Appl. No.: 298,980

[22] Filed: Jan. 19, 1989

[51] Int. Cl.[5] .............................................. H04N 9/64
[52] U.S. Cl. .................................................... 358/37
[58] Field of Search ................. 358/37, 38, 21 R, 166, 358/160, 39, 40

[56]  References Cited

U.S. PATENT DOCUMENTS

| 4,030,121 | 6/1977 | Faroudja | 358/37 |
| 4,316,215 | 2/1982 | Yasumoto | 358/166 |
| 4,331,971 | 5/1982 | Bretl | 358/37 |
| 4,581,631 | 4/1986 | Sonnenberger | 358/37 |

FOREIGN PATENT DOCUMENTS

| 2064731 | 7/1972 | Fed. Rep. of Germany | 358/37 |
| 59-89077 | 5/1984 | Japan . | |
| 2000935 | 1/1979 | United Kingdom | 358/37 |

Primary Examiner—Tommy P. Chin
Attorney, Agent, or Firm—Wenderoth, Lind & Ponack

[57] ABSTRACT

A waveform improving apparatus improves the contour of a waveform of a first signal which has a reduced frequency band by using a control signal generated from a second signal which has a correlation to the first signal. A waveform adjusting circuit increases the level of the first signal waveform at the rising slope portion thereof and decreases the level of the first signal waveform at the falling slope portion thereof to obtain a waveform-adjusted first signal. A control pulse generating circuit differentiates the second signal twice to obtain a control pulse having a predetermined duration and terminating at the center of a slope portion of the first signal waveform. A sample/hold circuit is responsive to the control pulse for sampling a level of the waveform-adjusted first signal and holding the sampled level during the duration of the control pulse thereby obtaining a waveform improved first signal.

15 Claims, 10 Drawing Sheets

WAVEFORM IMPROVING APPARATUS

BACKGROUND OF THE INVENTION

1. Field of the Invention

This invention relates to a waveform improving circuit for improving the waveform contour of a signal whose band is reduced such as, for example, a chrominance signal reproduced in a video tape recorder (VTR).

2. Description of the Prior Art

Figure 12:
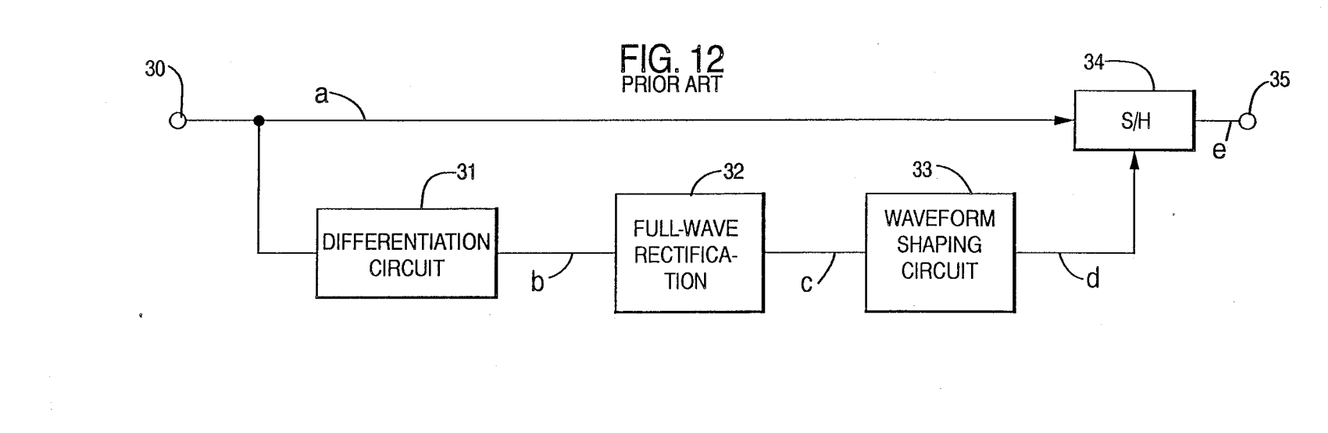
FIG. 12 is a block diagram of a conventional waveform improving circuit.
Figure 13:
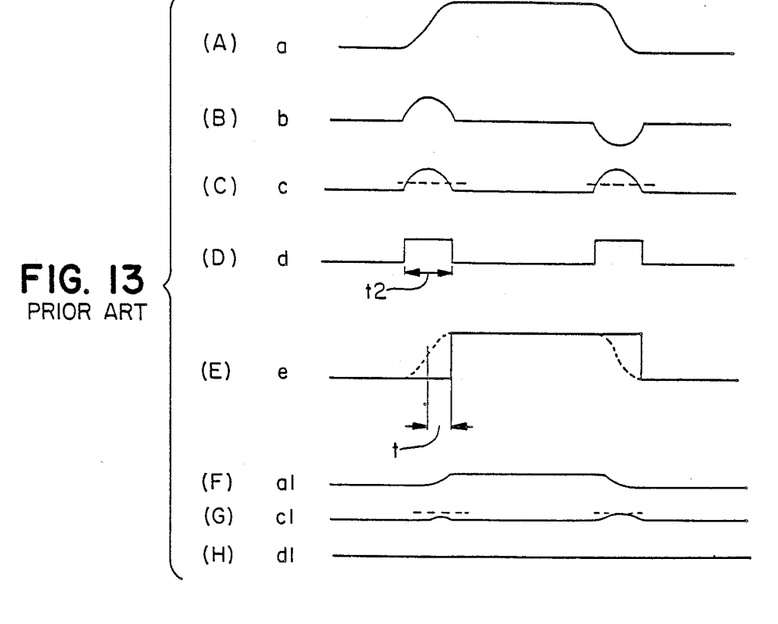
FIG. 13 shows waveforms of signals of components of the conventional circuit.

For a method of improving the waveform contour of a signal having its band reduced, refer to, for example, Laid-open Japanese Patent Application No. 59-89077. FIG. 12 is a block diagram showing a conventional circuit for this purpose. FIGS. 13(A) through (H) are diagrams showing the waveforms of signals of the circuit in FIG. 12. Referring to FIG. 12 and FIGS. 13(A) through (H), a color difference signal a whose band is reduced is inputted to a terminal 30 and differentiated by a differentiation circuit 31 to be a signal b. The signal b thus obtained is subjected to a full-wave rectification by a full-wave rectification circuit 32 to be a signal c. The signal c thus obtained is waveform-shaped by a waveform shaping circuit 33 to be a signal d. The input signal a is subjected to sample-hold in response to this signal d by a sample-hold circuit 34 thereby to obtain an output signal e. Referring to these diagrams, however, it can be pointed out that the output signal e is improved in the contour of its waveform but a deviation of time t is taken place at the edge portion thereof.

On the other hand, when the change in the level of the input signal a is small, the differential signal c is small, so that the control signal d cannot be generated. Thus the input signal is outputted with no improvement in the waveform contour. This means that deviation amount of the edge portion of the waveform contour of a signal depends on the waveform of that signal. Time interval t2 at which a sample-hold is made changes depending on an amount in change of the input signal. When the waveform of the input signal is changed largely, it is delayed and, on the other hand, when it is small in change, it is not delayed, thus resulting in variations in the timing of the edge of the waveform. From the standpoint of television image, colors which are small in change are shifted to the left thereby to cause a color divergence.

SUMMARY OF THE INVENTION

An object of the present invention is to provide a waveform improving apparatus which improves the waveform contour of a signal whose frequency band is reduced.

According to the present invention, a first input signal, which is a signal to be improved in its waveform contour, is adjusted in its waveform such that a level at substantially the center of the rising slope of the waveform is raised to be substantially equal to a level at the uppermost end of the rising slope and that a level at substantially the center of the falling slope of the waveform is reduced to be substantially equal to a level at the lowermost end of the falling slope. A second signal which has a correlation to the first signal is differentiated twice to obtain two control pulses each having a predetermined pulse width—one of which terminates at a timing substantially corresponding to the center of the rising slope of the first signal waveform and the other of which terminates at a timing substantially corresponding to the center of the falling slope of the first signal waveform. The waveform-adjusted first signal is sampled at the leading edge of each of the two control pulses and the sampled level is held during the duration of each control pulse thereby obtaining a waveform contour improved first signal. The second signal may be the same as the first signal.

The present invention is advantageously applicable to a video signal, which contains a luminance signal and a chrominance signal including a chrominance-difference signal, or which contains three primary color signals. The first signal may be a chrominance signal, and at this time the second signal may be either a luminance signal or the chrominance signal. Both the first and second signal may be a luminance signal. The first signal may be one of the three primary color signals, and at this time the second signal may be either the same as the first signal or another of the three primary color signals. In any case, the first and second signals may be selected such that they are correlated to each other. However, it is preferable to use a luminance signal as the second signal because the luminance signal generally has a high signal to noise ratio and a high frequency band. Both a luminance signal and a chrominance signal may be used for producing the control pulses.

In a fundamental structure, a waveform adjusting circuit for performing the waveform adjusting of the input first signal comprises: a differentiation circuit for differentiating the first signal; and an adder for adding the input first signal and an output of the differentiation circuit. A control pulse generating circuit for producing the control pulses from the second signal comprises: a first differentiation circuit for differentiating the input second signal; a full-wave rectification circuit for full-wave-rectifying an output of the first differentiation circuit; and a second differentiation circuit for differentiating an output of the full-wave rectification circuit. A waveform-adjusted first signal outputted from the waveform adjusting circuit is fed to a sample-and hold circuit which is responsive to each control pulse outputted from the control pulse generating circuit for sampling and holding the waveform-adjusted first signal to obtain a waveform contour improved first signal.

The waveform adjusting circuit may include a delay circuit for compensating a delay caused in the control pulse generating circuit. The control pulse generating circuit may include a waveform shaping circuit for shaping a pulse outputted from the second differentiation circuit into a rectangular waveform pulse.

It is preferable, when a luminance signal is used as the second signal, that the control pulse generating circuit is provided before the first differentiation circuit with a low-pass filter for limiting the frequency band of the first signal so that each of the control pulses generated by the control pulse generating circuit has a proper pulse width. Conveniently, this low-pass filter may reduce the band of the second signal to be approximately the same as the band of the first signal.

In a modified structure, the control pulse generating circuit may further comprise: a third differentiation circuit for differentiating the first signal; an additional full-wave rectification circuit for full-wave-rectifying an output of the third differentiation circuit; and an adder for adding outputs of the full-wave rectification circuit and the additional full-wave rectification circuit, an output of the adder being fed to the second differentiation circuit. This structure is advantageous in a case that the second signal is not always correlated to the first signal. This structure may be further modified such that a multiplier is provided between the first differentiation circuit and the full-wave rectification circuit for multiplying the outputs of the first and third differentiation circuits or between the full-wave rectification circuit and the adder for multiplying the outputs of the two full-wave rectification circuits. The multiplier operates as a kind of gate for passing the output of the first differentiation circuit to the second differentiation circuit only when there is a change in the first signal.

In another modified structure, the control pulse generating circuit may have a gate circuit which is inserted to any position after the first differentiation circuit for passing the output information of the first differentiation circuit to the subsequent stage only when there is a change in the first signal. In this case, a circuit for detecting a change in the first signal is provided for producing a gate control signal for the gate circuit. With such a gating, unnecessary operations of the sample-and-hold circuit can be avoided.

Further, when a luminance signal is used as the second signal, the control pulse generating circuit may further comprises: an additional low-pass having a higher response than that of the low-pass filter provided before the first differentiation circuit for limiting the band of the input second (luminance) signal; and additional differentiation circuit for differentiating an output of the additional low-pass filter; and an adder for adding outputs of the first and additional differentiation circuits, an output of the adder being fed to the full-wave rectification circuit. With this arrangement, a malfunction of the apparatus can be avoided when the level of the luminance signal is changed largely from one level to another through a small level change therebetween.

The above and other features and advantage of the present invention will be more apparent from the following description of the preferred embodiments taken in conjunction of the accompanying drawings in which:

DESCRIPTION OF THE PREFERRED EMBODIMENTS

Figure 1:
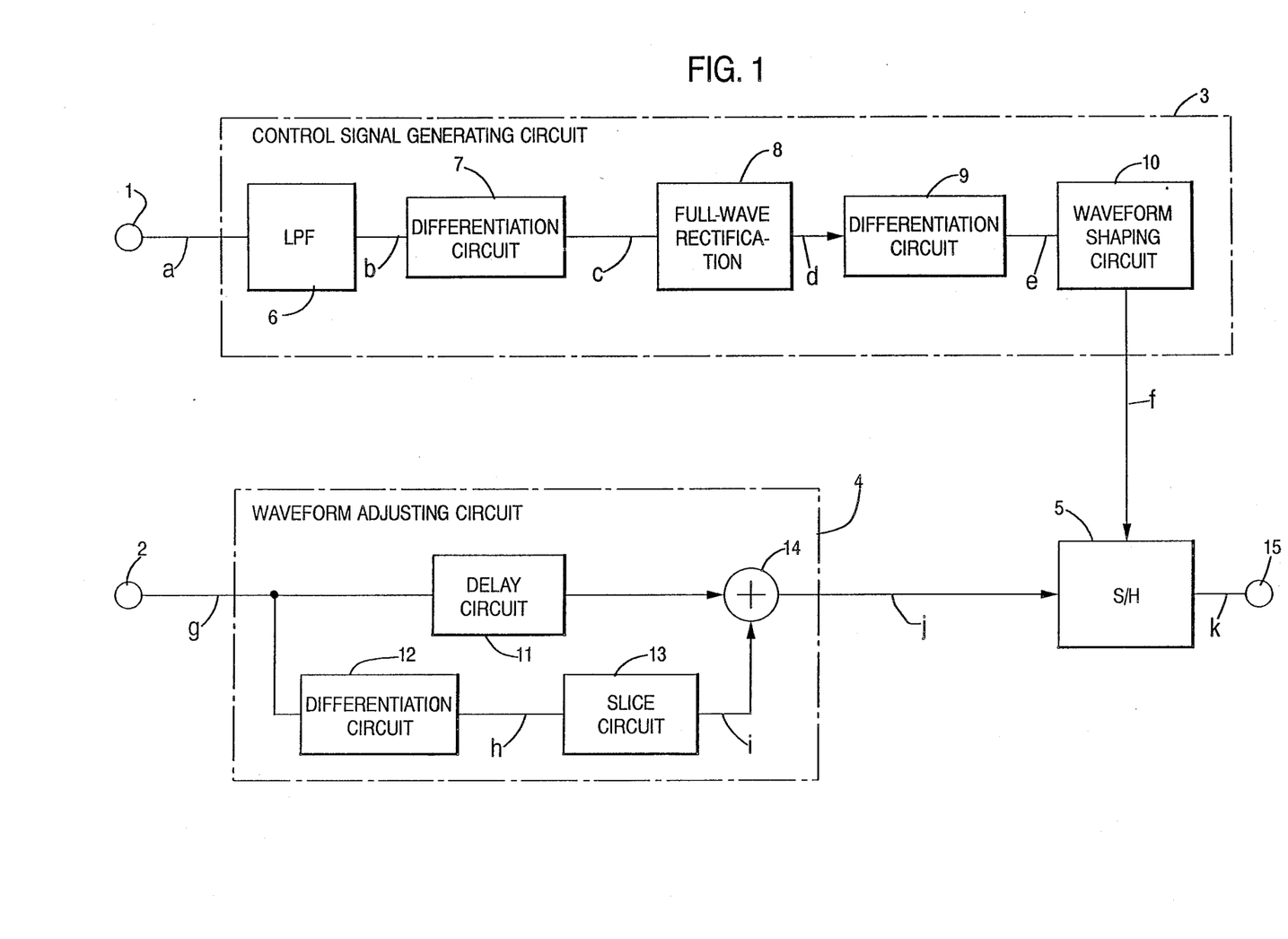
FIG. 1 is a block diagram of a waveform improving apparatus showing a first embodiment in accordance with this invention.
Figure 2:
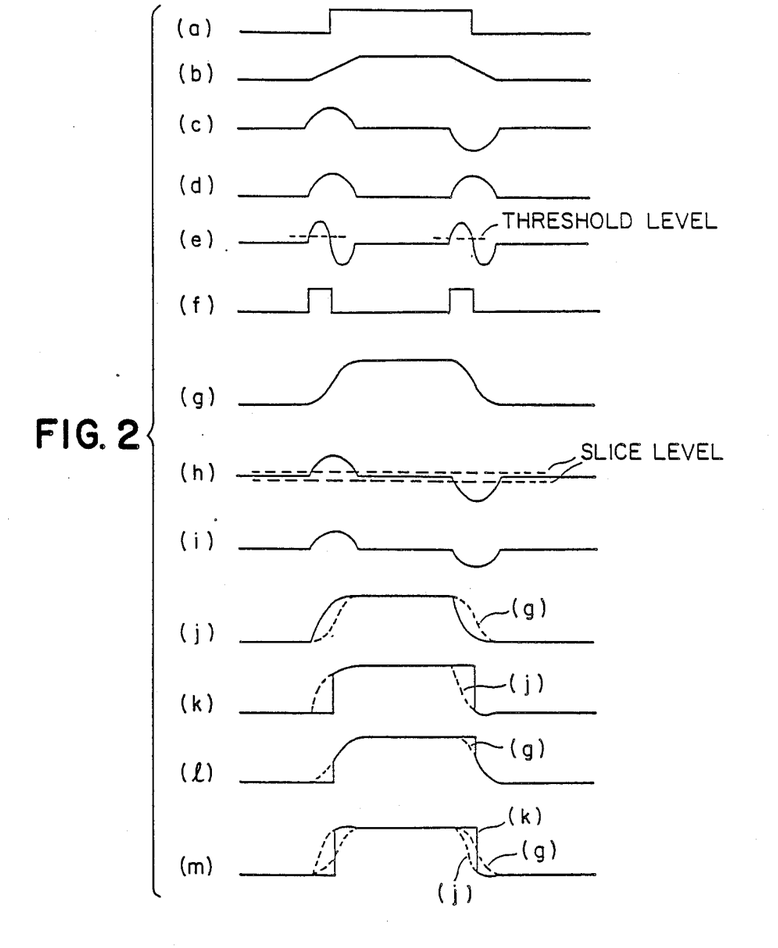
FIGS. 2 and 3 show waveforms of signals of the components constituting the waveform improving apparatus shown in FIG. 1.

FIG. 1 is a block diagram showing a waveform improving apparatus in accordance with a first embodiment of this invention, and FIG. 2 shows waveforms of signals of the components of the circuit in FIG. 1. In FIGS. 1 and 2, the reference letters (a) through (k) are designated correspondingly to each other. Since a video signal has a luminance signal and a color difference signal which are strongly correlated to each other, it may be considered that the luminance signal changes when the color difference signal changes. Therefore, in this first embodiment, a control signal f is obtained from the luminance signal.

A luminance signal a inputted into a terminal 1 is sent to control signal generating circuit 3. In the control signal generating circuit 3 the frequency band of the input signal is limited by a low-pass filter (LPF) 6 to be a signal b. The band-limited signal b is differentiated by a first differentiation circuit 7 to be a signal c. The signal c thus obtained is subjected to a full-wave rectification by a full-wave rectification circuit 8 to be a signal d. The signal d thus obtained is differentiated by a second differentiation circuit 9 to be a signal e. A waveform shaping circuit 10 detects a positive pulse portion of the signal c thus differentiated to obtain a control signal f. The control signal f thus obtained occurs from the beginning point of each edge slope part of the signal b to the center of the same.

A color difference signal g (for example, R-Y or B-Y signal) is inputted to a terminal 2 and then fed to a waveform adjusting circuit 4. In the waveform adjusting circuit 4, the color difference signal g is inputted to a delay circuit 11 which has a suitable delay time corresponding to a processing time in the control signal generating circuit 3, and, at the same time, inputted to a differentiation circuit 12. An output signal h of the differentiation circuit 12 is sliced at a small level by a slice circuit 13 in order to eliminate noise components thereby to obtain a signal i. The slice circuit 13 is not an inherently necessary circuit, and may be omitted. The signal i is added by an adder 14 with the output of the delay circuit 11 to obtain a signal j. The signal j thus obtained is subjected to sample-hold in response to the control signal f by a sample-hold circuit 5 to obtain a waveform contour improved signal k, which is outputted from a terminal 15. The waveform contour improving effect can be clearly seen by comparing the signal k with the input band-reduced signal g. In this case, if the output signal i of the slice circuit 13 is not added with the output of the delay circuit 11, the output signal k becomes as shown in (, so that the contour improving effect is halved. Therefore, it is preferable that the signal i is added with the output of the delay circuit 11 by the adder 14 so as to obtain the waveform of the signal k. The delay circuit 11 may be or may not be included in the waveform adjusting circuit 4.

FIG. 2 (m) is a diagram schematically superposing the input signal g, the signal j and the output signal k. This clearly shows that the waveform contour is largely improved and yet no time delay at the edge portion of the output signal is generated. In other words, a waveform improving circuit of this invention achieves the waveform contour improving process of a signal at the center of each edge slope of the waveform thereof, which means that there is no time lag due to process.

Next, such a case will be considered that there exists a fine red line as a specific input signal just before a video signal changes from black to white, for example, as shown in FIGS. 3(A) through (H). The luminance signal is indicated as signal a. When a control signal is generated by the control signal generating circuit as shown in FIG. 1, waveforms a through f as schematically illustrated in FIGS. 3(A)-(E) are produced an consequently the signal to be outputted will become as shown at k. In which, reference letters a through k in FIG. 3 correspond to the reference letters a through k in FIG. 1, respectively. The control signal f lasts almost through the interval of red, so that if sample-hold is made before the color difference signal indicates red an interval where the image is not colored is possibly generated. This is not preferable.

Figure 3:
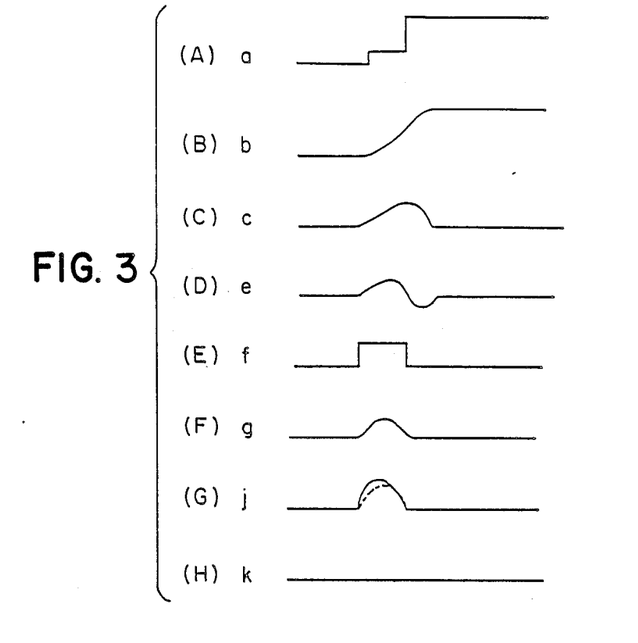
Figure 4:
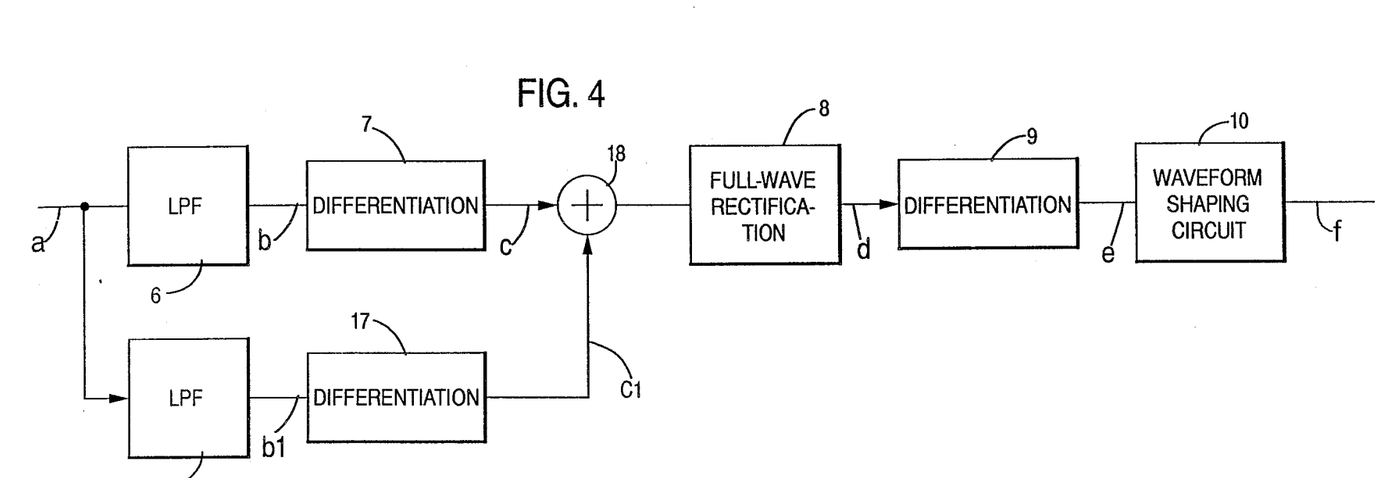
FIG. 4 is a block diagram of a control signal generating circuit showing a second embodiment of this invention.

Accordingly, a second embodiment of the control signal generating circuit 3 of the waveform improving circuit of this invention is shown in FIG. 4. As clearly shown in FIG. 4 are disposed a low-pass filter (LPF) 16, a differentiation circuit 17 and an adder 18 additionally to the circuit shown in FIG. 1. Here, the LPF 16 has a cutoff frequency which is higher than that of the LPF 6 shown in FIG. 1. The waveforms of signals of the components of the circuit in FIG. 4 are shown in FIGS. 5(A) through (H), respectively. The luminance signal a is band-limited by the LPF 16 to be a signal b1 which is subsequently differentiated by the differentiation circuit 17 to be a signal c1. The differential signal c1 is added by the adder 18 to the differential signal c and rectified thereby to produce the signal d. The secondary differential signal becomes as an signal e and the control signal f is obtained. Color difference output signals obtained when the color difference signal is subjected to the sample-hold by the signal f in FIG. 5 and the signal f in FIG. 3 are shown in FIGS. 6(A) through (G), respectively.

Figure 5:
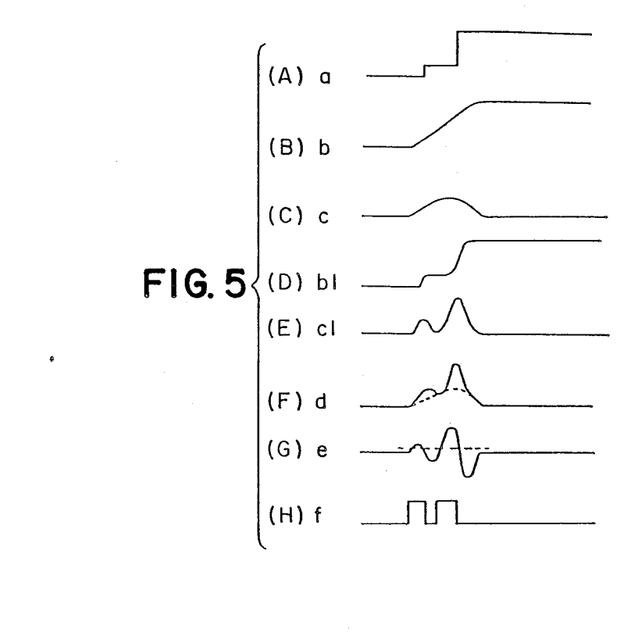
FIG. 5 shows waveforms of signals of the components of the circuit shown in FIG. 4.
Figure 6:
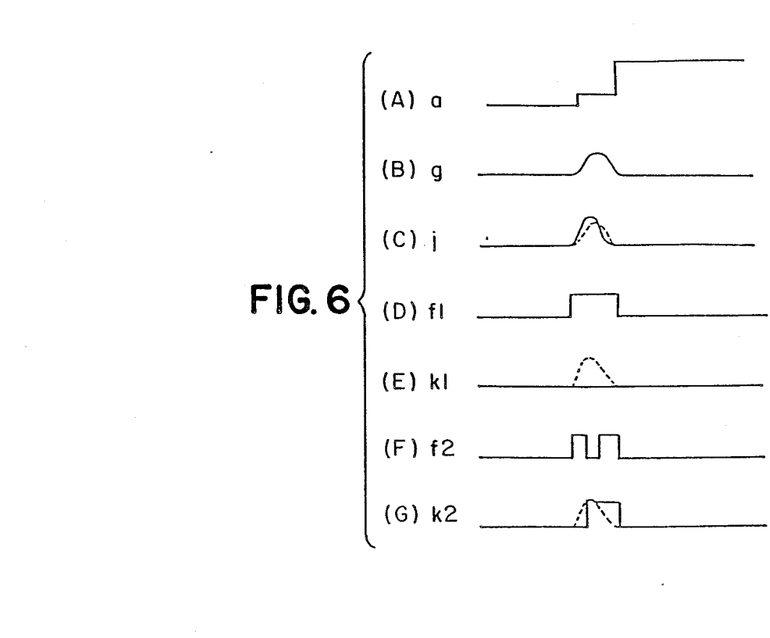
FIG. 6 shows waveforms of signals of a waveform improving apparatus shown in FIG. 4.

In FIG. 6 are shown the luminance signal a, color difference signal g, added signal j, signal f1 which is identical to the signal f shown in FIG. 3, signal k1 which is produced by use of signal f1, signal f2 which is identical to the signal f shown in FIG. 5, and signal k2 which is produced by use of signal f2. In the signal k2, such a decoloration as is seen in the case of the signal k1 is not generated.

Figure 7:
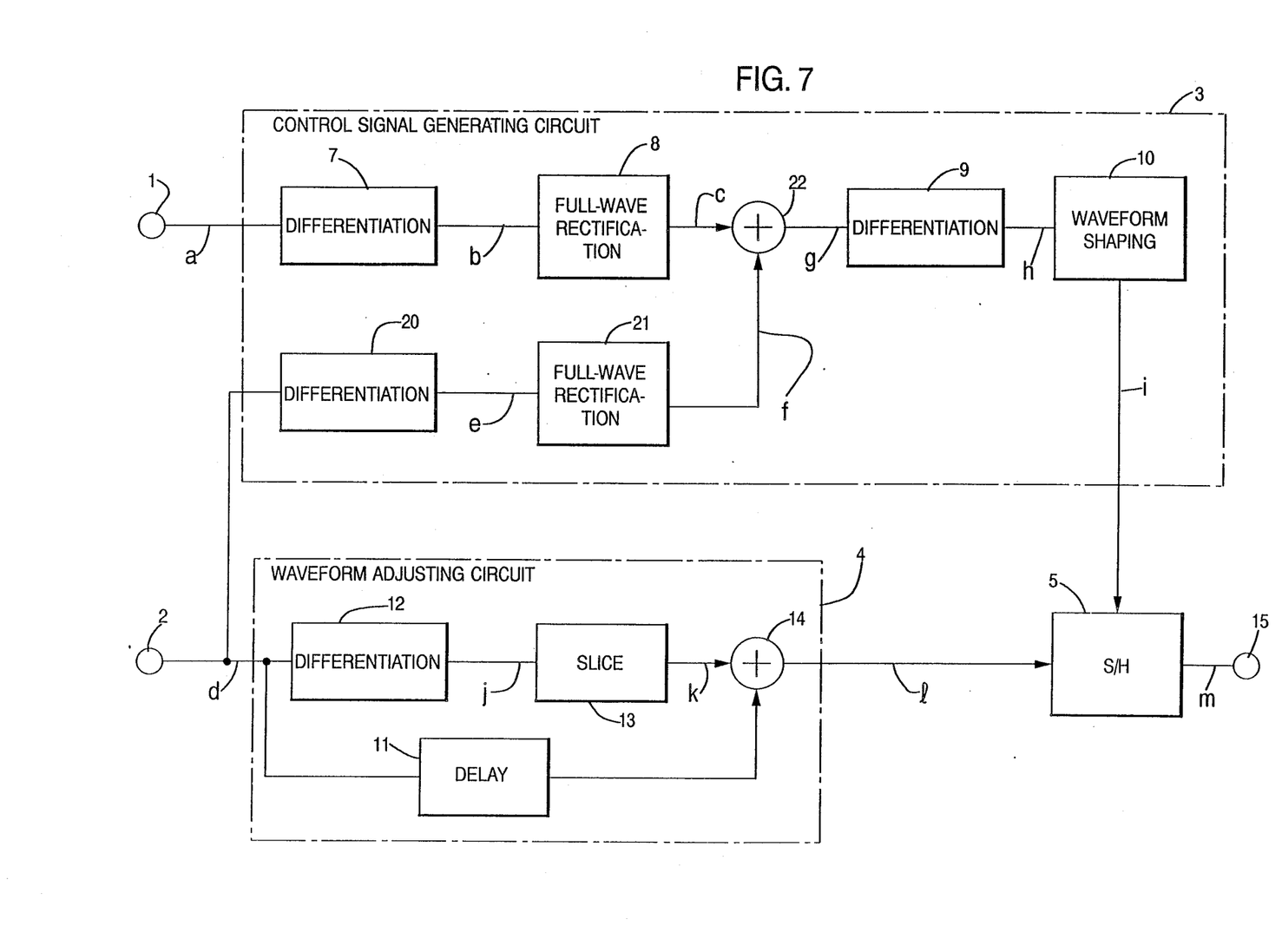
FIG. 7 is a block diagram of a waveform improving apparatus in accordance with a third embodiment of this invention.
Figure 8:
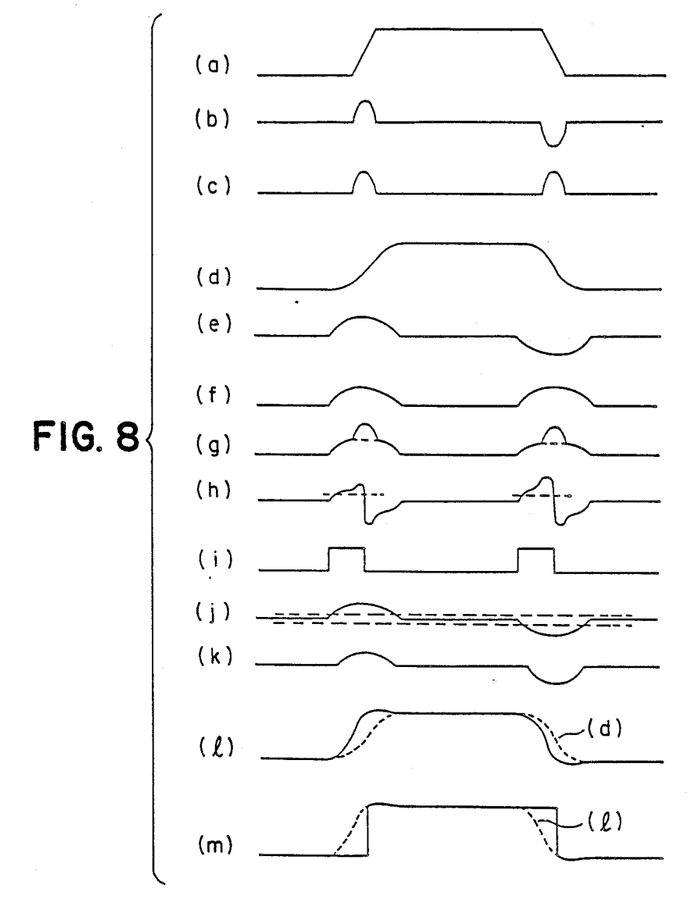
FIG. 8 shows waveforms of signals of the components of the apparatus shown in FIG. 7.

FIG. 7 is a block diagram showing a waveform improving apparatus in accordance with a third embodiment of the invention, and FIG. 8 shows waveforms of signals from the components of the apparatus in FIG. 7. Reference letters shown in FIG. 7 and FIGS. 8(a) to (k) are designated correspondingly to each other. In the third embodiment, the control signal for improving the edge of a chrominance signal is made from the information on the change in chrominance signal is made from the information on the change in chrominance signal and the information oh the change in luminance signal.

A luminance signal a inputted to a terminal 1 is differentiated by a differentiation circuit 7 to obtain a signal b. A color difference signal d which is input to a terminal 2 is differentiated by a differentiation circuit 20 to obtain a signal e. In the control signal generating circuit 3, the two signals b and c are subjected to full-wave rectification by full-wave rectification circuits 8 and 21 to obtain signals c and f, respectively. The signals c and f thus obtained are added by an adder 22 to output a signal g. The signal g is differentiated by a differentiation circuit 9 to output a signal h. The signal h is waveform-shaped by a waveform shaping circuit 10 thereby to obtain a control signal i.

Next, the reason that the information on the luminance signal a and the chrominance difference signal d are used in order to obtain the control signal i in this embodiment will be explained. The luminance signal a is generally superior in S/N ratio to the color difference signal d, so that it is preferable that the control signal is obtained from the luminance signal. However, in case that a video signal has no change in luminance signal but changes only in color difference signal, if only the information on the luminance signal is used to obtain the control signal, it is impossible to generate the control signal, which means that the waveform contour improvement is impossible to be achieved. Accordingly, when there exists a change in the luminance signal, the information on the luminance signal is used, and, on the other hand, when there exists no change in the luminance signal, the control signal is generated from the change in the color difference signal. This function is accomplished by the arrangement as shown in FIG. 7.

Figure 9:
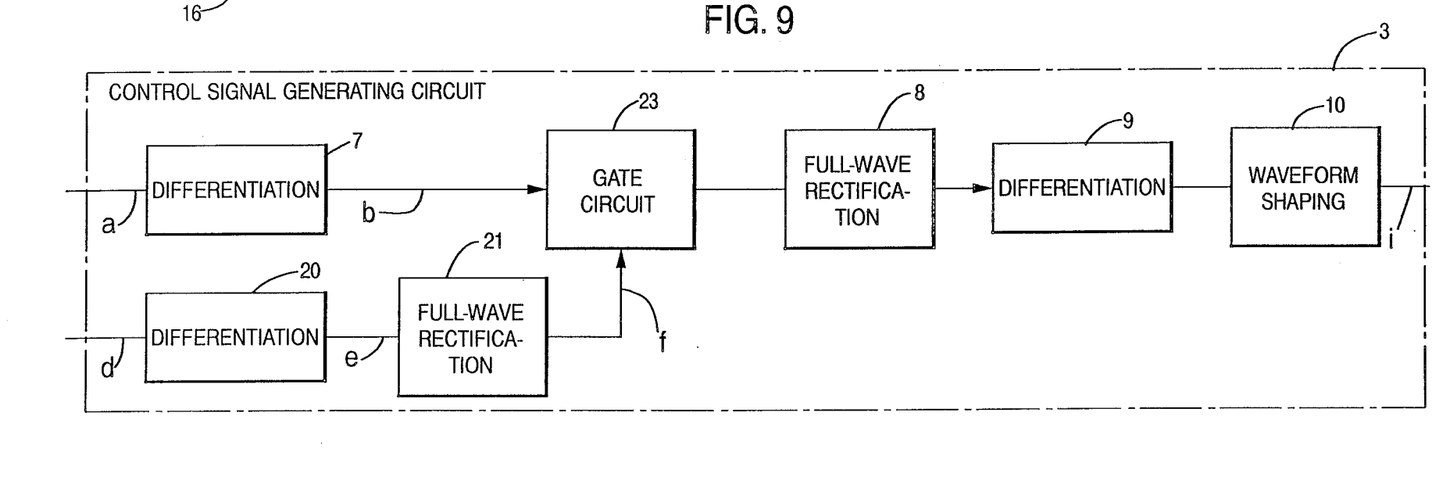
FIGS. 9 and 10 are block diagrams of control signal generating circuits of forth and fifth embodiments of this invention, respectively.

Next, a fourth embodiment of the control signal generating circuit is shown in FIG. 9. In FIG. 9, the differential signal b of the luminance signal a is fed to a gate circuit 23. The gate circuit 23 is controlled by the signal f which is obtained through the full-wave recification of the differential signal e of the color difference signal d. The gate circuit 23 is turned ON when the signal f becomes a specific output level. In other words, a control signal i is obtained using the information on the change in the luminance signal only when the color difference signal is being changed. This means that when the color difference signal has no change, no control signal is generated, so that such a malfunction that may execute a sample-hold at an unnecessary timing will be prevented from taking place. In this case, the gate circuit 23 can be insertedly disposed at any position in the path from the front of the full-wave rectification circuit 8 to the rear of the waveform shaping circuit 10 in FIG. 9.

Figure 10:
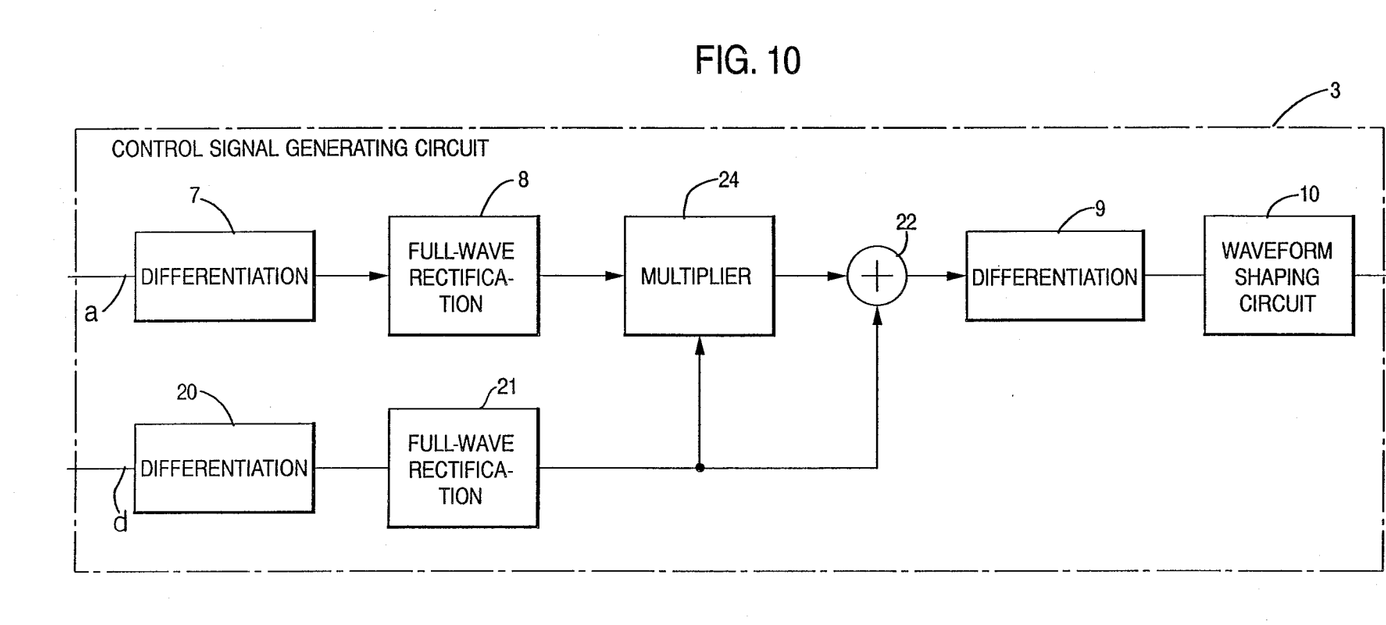

Next, a fifth embodiment of the control signal generating circuit is shown in FIG. 10 in a block diagram form. In FIG. 10, a multiplier 24 is used instead of the gate circuit 23 in FIG. 9 and an adder 22 is insertedly used successively thereto. In this arrangement, when both the luminance signal a and color difference signal d are changed, the waveform contour of the color difference signal can be improved based on the change in the luminance signal which is superior in S/N ratio, and when there exists no correlation between the change in the luminance signal and the change in the color difference signal, the waveform contour is improved by the information on the change of the color difference signal itself.

Figure 11A:
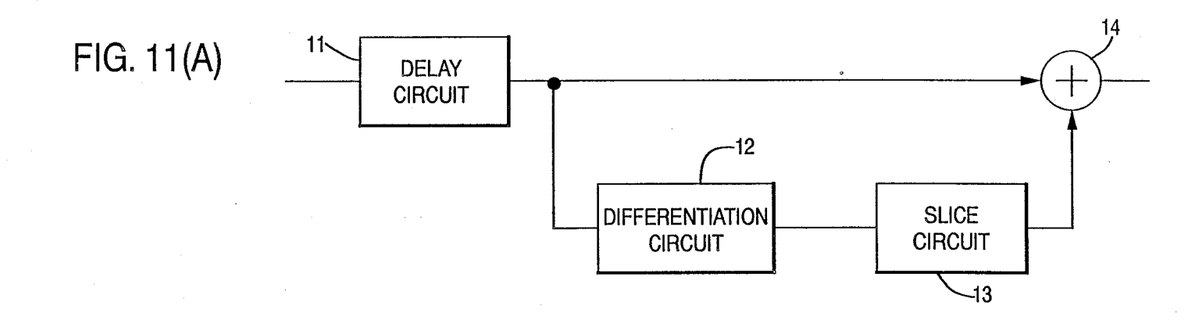
FIG. 11 is a block diagram of a waveform adjusting circuit in accordance with this invention.
Figure 11B:
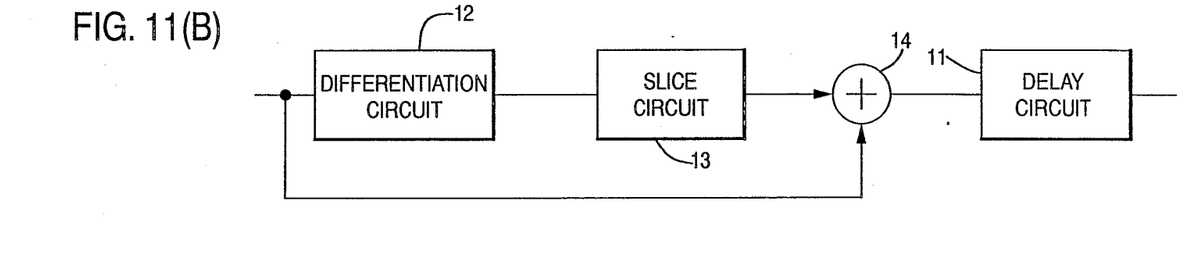

In the above-mentioned embodiments, in order to construct the waveform adjusting circuit 4, the delay circuit 11 can be disposed at either front portion of the differentiation circuit 12 or rear portion of the adder 14 as shown in FIGS. 11(A) and (B). The delay circuit in the waveform adjusting circuit 4 is not always necessary and may be omitted.

In addition, the luminance signal and color difference signal are exemplified as the two input signals of the apparatus of this invention, but the two input signals may be identical to each other. For example, both of the two input signals are a color difference signal or a luminance signal. When the color difference signals, R-Y and B-Y, are subjected to the waveform contour improvement using a control signal obtained from the luminance signal as shown in the above-mentioned embodiments of this invention, such an effect can be obtained that the time lag of the color difference signals can be coincided with that of the luminance signal.

Further in addition, the LPF 6 in the control signal generating circuit 3 shown in the first embodiment of this invention may be omitted.

What is claimed is:

1. A waveform improving apparatus comprising:
   means for raising a level at substantially the center of a rising slope portion of a waveform of a first signal to be substantially equal to a level at the uppermost end of the rising slope portion and for reducing a level at substantially the center of a falling slope portion of the waveform of the first signal to be substantially equal to a level at the lowermost end of the falling slope portion thereby to obtain a waveform-adjusted first signal;
   means for differentiating a second signal which has a correlation to the first signal twice to obtain two control pulses each having a predetermined pulse width, one of the two control pulses terminating at a timing substantially corresponding to the center of the rising slope portion of the waveform of the first signal, and the other of the two control pulses terminating at a timing substantially corresponding to the center of the falling slope portion of the waveform of the first signal; and
   means responsive to the two control pulses for sampling a level of the waveform-adjusted first signal at the leading edge of each of the two control pulses and holding a sampled level during a duration of each of the two control pulses to obtain a waveform improved first signal.

2. A waveform improving apparatus comprising:
   first differentiation means for differentiating a first signal;
   adding means for adding an output signal of the first differentiation means and the first signal to obtain a waveform-adjusted first signal;
   second differentiation means for differentiating a second signal which has a correlation to the first signal;
   full-wave rectification means for full-wave rectifying an output signal of the second differentiation means;
   third differentiation means for differentiating an output signal of the full-wave rectification means to obtain a control pulse; and
   sampling and holding means responsive to the control pulse for sampling a level of the waveform-adjusted first signal at the leading edge of the control pulse and holding a sampled level during a duration of the control pulse to obtain a waveform improved first signal.

3. An apparatus according to claim 2, further comprising slicing means for slicing the output signal of the first differentiation means at a predetermined level to eliminate noise components.

4. An apparatus according to claim 2, further comprising low-pass filter means provided before the second differentiation means for limiting a frequency band of the second signal.

5. An apparatus according to claim 2, wherein the first signal is a chrominance signal of a video signal and the second signal is a luminance signal of the video signal.

6. An apparatus according to claim 5, further comprising low-pass filter means provided before the second differentiation means for limiting a frequency band of the luminance signal.

7. An apparatus according to claim 6, wherein the low-pass filter means limits the frequency band of the luminance signal to be substantially equal to a frequency band of the chrominance signal.

8. An apparatus according to claim 6, further comprising:
   additional low-pass filter means having a higher cut-off frequency than that of the low-pass filter means for limiting the frequency band of the luminance signal;
   fourth differentiation means for differentiating an output signal of the additional low-pass filter means; and
   additional adding means provided between the second differentiation means and the full-wave rectification means for adding the output signal of the second differentiation means and an output signal of the fourth differentiation means, an output signal of the additional adding means being fed to the full-wave rectification means.

9. An apparatus according to claim 2, further comprising:
   detecting means for detecting a change of the first signal to obtain a detection signal; and
   gating means provided in a signal path from the second differentiation means to the sampling and holding means and responsive to the detection signal for transmitting information of the output signal of the second differentiation means to the sampling and holding means only when there occurs a change of the first signal.

10. An apparatus according to claim 9, wherein the detecting means comprises:
    fourth differentiation means for differentiating the first signal; and
    full-wave rectification means for full-wave rectifying an output signal of the fourth differentiation means to obtain the detection signal.

11. An apparatus according to claim 2, further comprising:
    fourth differentiation means for differentiating the first signal;
    additional full-wave rectification means for full-wave rectifying an output signal of the fourth differentiation means; and
    additional adding means provided between the full-wave rectification means and the third differentiation means for adding the output signal of the full-wave rectification means and an output of the additional full-wave rectification means and feeding an added result to the third differentiation means.

12. An apparatus according to claim 11, wherein the first signal is a chrominance signal of a video signal and the second signal is a luminance signal of the video signal.

13. An apparatus according to claim 11, further comprising gating means provided in a signal path from the second differentiation means to the additional adding means and responsive to the output signal of the additional full-wave rectification means for transmitting information of the output signal of the second differentiation means to the additional adding means only when the output signal of the additional full-wave rectification means exceeds a predetermined level.

14. An apparatus according to claim 13, wherein the gating means comprises multiplying means for multiplying the output signals of the two full-wave recification means and feeding a multiplied result to the additional adding means.

15. An apparatus according to claim 2, further comprising waveform shaping means coupled between the third differentiation means and the sampling and holding means for shaping the control pulse into a rectangular waveform pulse.

* * * * *